US012609726B2

(12) United States Patent
Raghavan et al.

(10) Patent No.: US 12,609,726 B2
(45) Date of Patent: Apr. 21, 2026

(54) ANTENNA SIDE COMBINING OR ANTENNA SIDE SELECTION IN AN L-SHAPED ANTENNA MODULE

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Raghu Narayan Challa, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 17/812,331

(22) Filed: Jul. 13, 2022

(65) Prior Publication Data

US 2024/0022281 A1 Jan. 18, 2024

(51) Int. Cl.
| | |
|---|---|
| *H04B 1/401* | (2015.01) |
| *H04B 7/06* | (2006.01) |
| *H04B 7/08* | (2006.01) |

(52) U.S. Cl.
CPC ........... *H04B 1/401* (2013.01); *H04B 7/0686* (2013.01); *H04B 7/0842* (2013.01)

(58) Field of Classification Search
CPC .... H04B 1/401; H04B 7/0686; H04B 7/0842; H04B 7/0469; H04B 7/0874; H04B 7/10; H04B 7/0691; H01Q 1/243; H01Q 3/24; H01Q 21/0025; H01Q 21/06
See application file for complete search history.

(56) References Cited

U.S. PATENT DOCUMENTS

| | | | | |
|---|---|---|---|---|
| 9,905,922 | B2 * | 2/2018 | Lee | H01Q 3/24 |
| 11,380,988 | B2 * | 7/2022 | Hassan | H04B 1/40 |
| 12,132,255 | B2 * | 10/2024 | Tienda Herrero | H01Q 21/06 |
| 2013/0308554 | A1 * | 11/2013 | Ngai | H04B 1/44 |
| 2013/0309981 | A1 | 11/2013 | Ngai et al. | |
| 2015/0249291 | A1 * | 9/2015 | Schmidt | H01Q 1/246 |
| | | | | 343/853 |
| 2017/0110786 | A1 * | 4/2017 | Liu | H01Q 1/243 |

(Continued)

FOREIGN PATENT DOCUMENTS

| | | |
|---|---|---|
| WO | WO-2013033650 A1 | 3/2013 |
| WO | WO-2019146183 A1 | 8/2019 |

(Continued)

OTHER PUBLICATIONS

International Search Report and Written Opinion—PCT/US2023/024003—ISA/EPO—Aug. 30, 2023.

(Continued)

*Primary Examiner* — Lana N Le
(74) *Attorney, Agent, or Firm* — Harrity & Harrity, LLP

(57) ABSTRACT

Various aspects of the present disclosure generally relate to wireless communication. In some aspects, a user equipment (UE) may determine a target mode in which to operate an L-shaped antenna module that includes a first antenna sub-array on a first side of the L-shaped antenna module and a second antenna subarray on a second side of the L-shaped antenna module. The UE may configure the L-shaped antenna module to operate in the target mode. Numerous other aspects are described.

30 Claims, 9 Drawing Sheets

500

510
Side combining mode

520
Side selection mode

Device front
Device back

⊡ Active antenna element
▨ Inactive antenna element

(56) References Cited

U.S. PATENT DOCUMENTS

| | | | |
|---|---|---|---|
| 2020/0029274 A1 | 1/2020 | Cheng et al. | |
| 2020/0091608 A1* | 3/2020 | Alpman | H01Q 1/243 |
| 2021/0159946 A1* | 5/2021 | Raghavan | H04B 7/0691 |
| 2022/0069896 A1* | 3/2022 | Besoli | H04B 7/0695 |
| 2022/0086818 A1* | 3/2022 | Nam | H04W 72/21 |
| 2022/0131269 A1* | 4/2022 | Choi | H04M 1/0266 |
| 2022/0407546 A1 | 12/2022 | Nishio et al. | |
| 2023/0163465 A1* | 5/2023 | Tehran | H01Q 21/065 |
| 2024/0106520 A1* | 3/2024 | Farahani | H04B 7/0874 |
| 2025/0070844 A1* | 2/2025 | Cezanne | H04B 7/0691 |

FOREIGN PATENT DOCUMENTS

| | | | | |
|---|---|---|---|---|
| WO | WO-2021090607 A1 | | 5/2021 | |
| WO | WO-2022083508 A1 | * | 4/2022 | |
| WO | WO-2022103551 A1 | | 5/2022 | |
| WO | WO-2022126663 A1 | * | 6/2022 | |
| WO | WO-2022240054 A1 | * | 11/2022 | H04W 8/24 |

OTHER PUBLICATIONS

Moderator (OPPO): "Summary #1 of 8.4.4 Other Aspects of NR-NTN", 3GPP TSG RAN WG1 Meeting #104e, R1-2101806, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 25, 2021, 23 Pages, XP051975908, The whole document.

Moderator (OPPO): "Summary #1 of 8.4.4 Other Aspects of NR-NTN", 3GPP TSG RAN WG1 Meeting #104e, R1-2101960, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 29, 2021, 43 Pages, XP051976030, The whole document.

OPPO: "Discussion on Beam Management", 3GPP TSG RAN WG1 #106bis-e, R1-2109079, 3rd Generation Partnership Project, Mobile Competence Centre, 650, Route Des Lucioles, F-06921 Sophia-Antipolis Cedex, France, vol. RAN WG1, No. e-Meeting, Oct. 11-2021-Oct. 19, 2021, Oct. 1, 2021, 2 Pages, XP052058039, The whole document.

* cited by examiner

415
L-shaped
antenna module

410
UE with L-shaped antenna
module on one edge 405-3
Antenna module 405-2
Antenna module 405-1
Antenna module 400
UE with multiple antenna
modules on separate edges 580
Control operations based on target mode for L-shaped antenna Network Node 570
Signaling related to target mode for L-shaped antenna 560
Select target mode for L-shaped antenna

500

610 — Determine a target mode in which to operate an L-shaped antenna module that includes a first antenna subarray on a first side of the L-shaped antenna module and a second antenna subarray on a second side of the L-shaped antenna module 620 — Configure the L-shaped antenna module to operate in the target mode

600

ANTENNA SIDE COMBINING OR ANTENNA SIDE SELECTION IN AN L-SHAPED ANTENNA MODULE

FIELD OF THE DISCLOSURE

Aspects of the present disclosure generally relate to wireless communication and to techniques and apparatuses associated with antenna side combining or antenna side selection in an L-shaped antenna module.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining a target mode in which to operate an L-shaped antenna module that includes a first antenna subarray on a first side of the L-shaped antenna module and a second antenna subarray on a second side of the L-shaped antenna module. The method may include configuring the L-shaped antenna module to operate in the target mode.

Some aspects described herein relate to a UE for wireless communication. The UE may include a memory and one or more processors coupled to the memory. The one or more processors may be configured to determine a target mode in which to operate an L-shaped antenna module that includes a first antenna subarray on a first side of the L-shaped antenna module and a second antenna subarray on a second side of the L-shaped antenna module. The one or more processors may be configured to configure the L-shaped antenna module to operate in the target mode.

Some aspects described herein relate to a non-transitory computer-readable medium that stores a set of instructions for wireless communication by a UE. The set of instructions, when executed by one or more processors of the UE, may cause the UE to determine a target mode in which to operate an L-shaped antenna module that includes a first antenna subarray on a first side of the L-shaped antenna module and a second antenna subarray on a second side of the L-shaped antenna module. The set of instructions, when executed by one or more processors of the UE, may cause the UE to configure the L-shaped antenna module to operate in the target mode.

Some aspects described herein relate to an apparatus for wireless communication. The apparatus may include means for determining a target mode in which to operate an L-shaped antenna module that includes a first antenna subarray on a first side of the L-shaped antenna module and a second antenna subarray on a second side of the L-shaped antenna module. The apparatus may include means for configuring the L-shaped antenna module to operate in the target mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
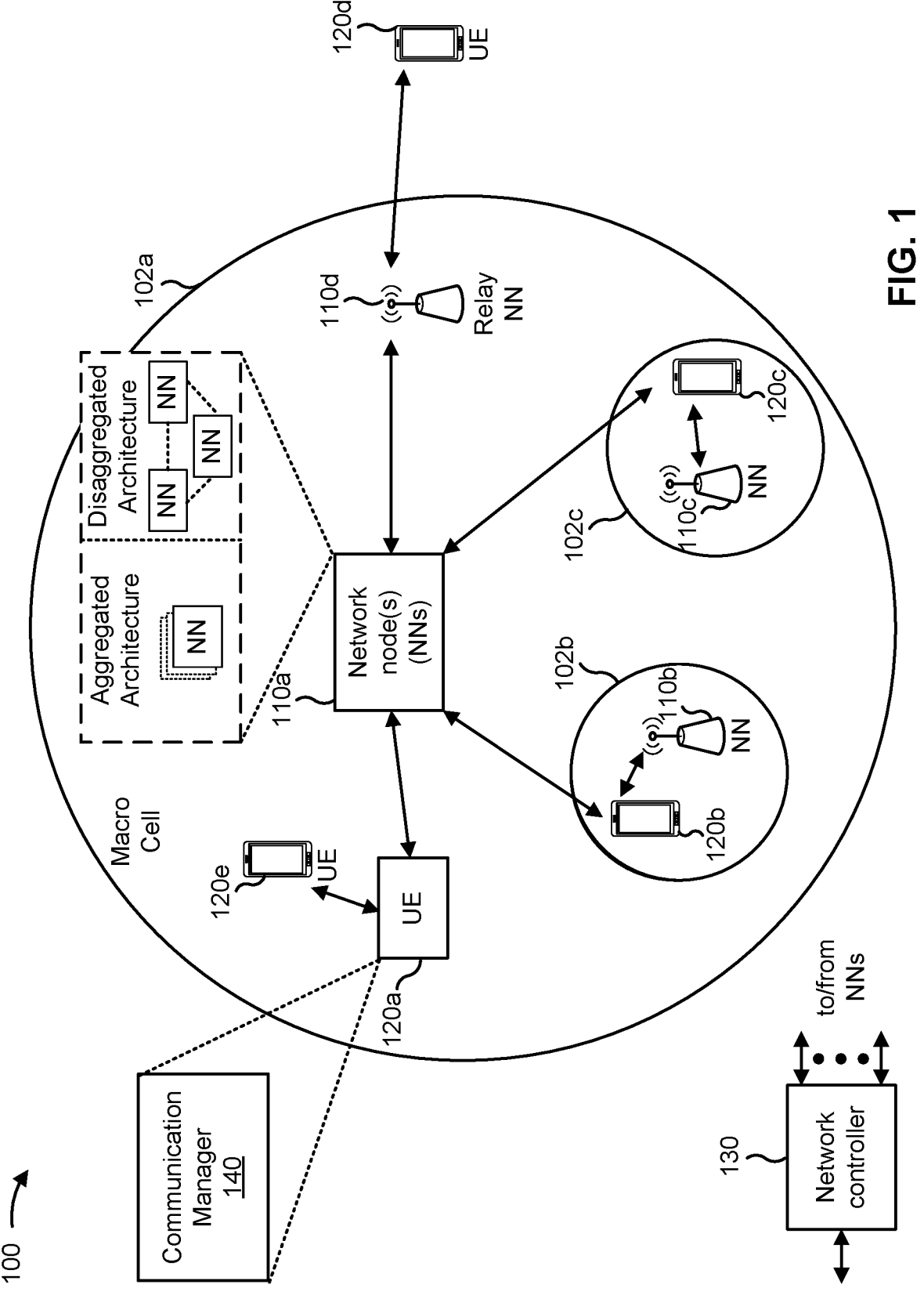
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine a target mode in which to operate an L-shaped antenna module that includes a first antenna subarray on a first side of the L-shaped antenna module and a second antenna subarray on a second side of the L-shaped antenna module; and configure the L-shaped antenna module to operate in the target mode. Additionally, or alternatively, the communication manager 140 may perform one or more other operations described herein.

As indicated above, FIG. 1 is provided as an example. Other examples may differ from what is described with regard to FIG. 1.

Figure 2:
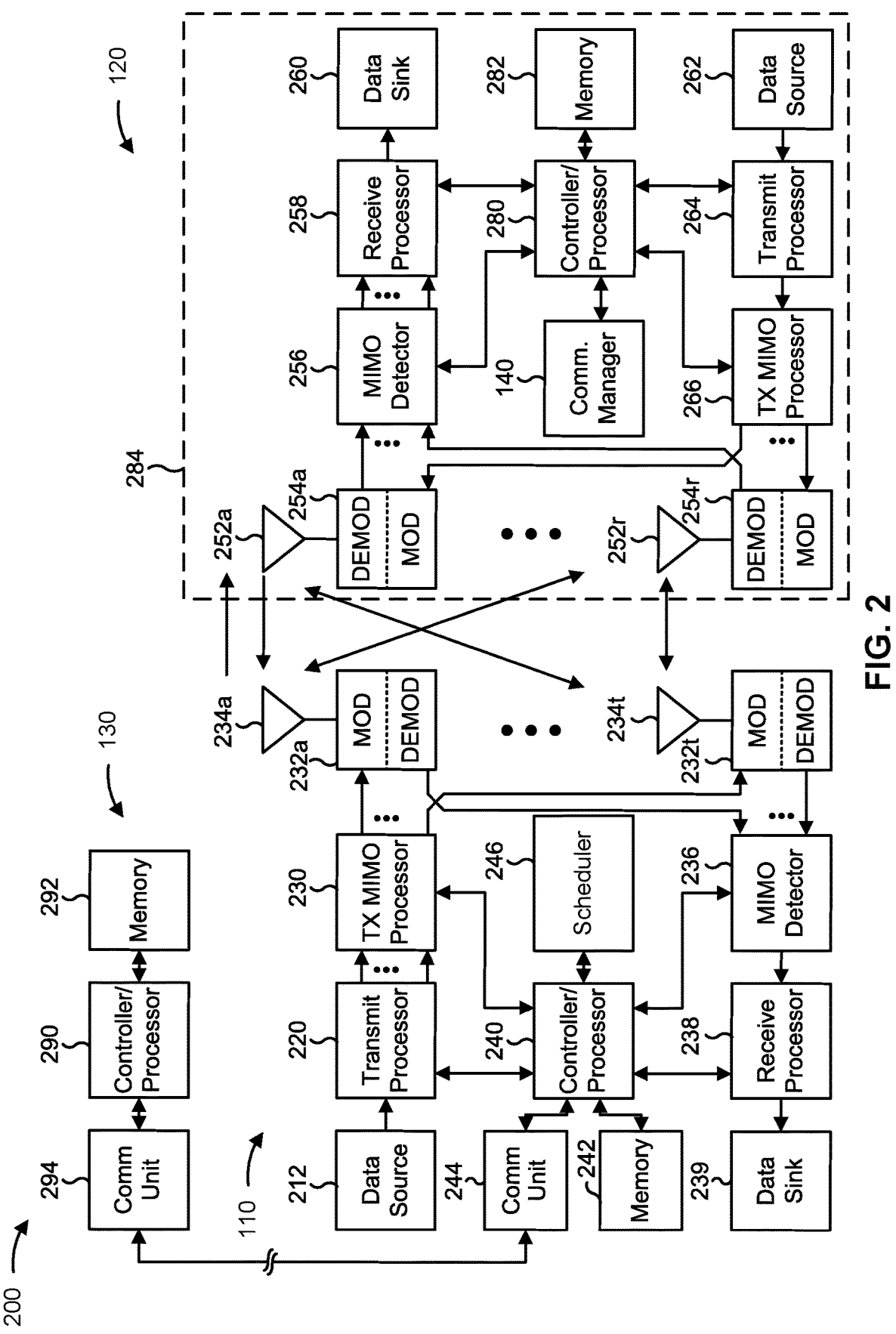
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-5C, FIG. 6, and/or FIG. 7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-5C, FIG. 6, and/or FIG. 7).

The controller/processor 240 of the network node 110, the controller/processor 280 of the UE 120, and/or any other component(s) of FIG. 2 may perform one or more techniques associated with antenna side combining or antenna side selection in an L-shaped antenna module, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for determining a target mode in which to operate an L-shaped antenna module that includes a first antenna subarray on a first side of the L-shaped antenna module and a second antenna subarray on a second side of the L-shaped antenna module; and/or means for configuring the L-shaped antenna module to operate in the target mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, for network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
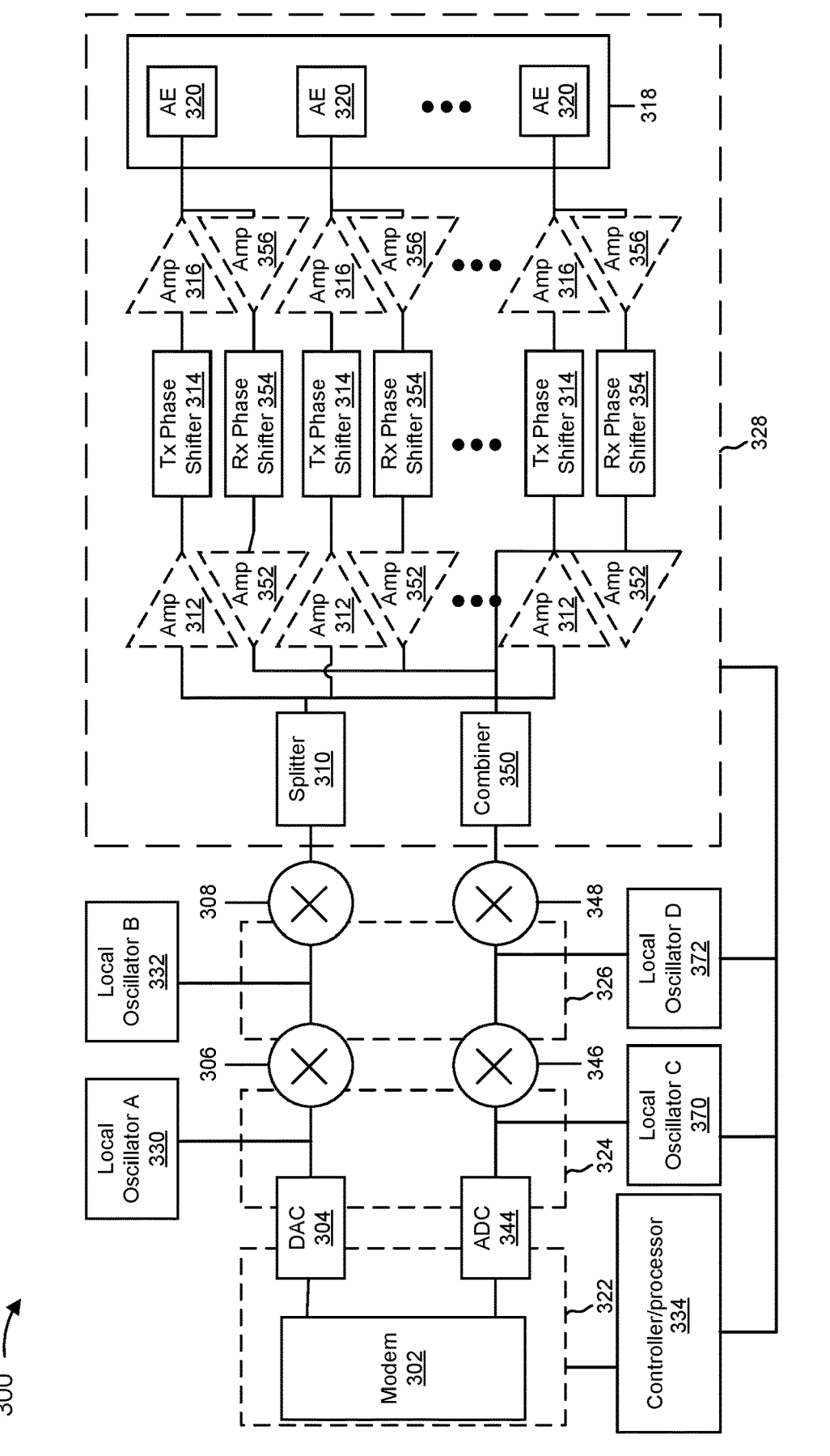
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless node, such as a UE, a base station, a TRP, an integrated access and backhaul (IAB) node, a CU, a DU, an RU, a network node, or another suitable wireless communication device) and/or a receiving device (e.g., a second wireless node, such as a UE, a base station, a TRP, an IAB node, a CU, a DU, an RU, a network node, or another suitable wireless communication device), as described herein.

Broadly, FIG. 3 is a diagram illustrating example hardware components of a wireless node in accordance with certain aspects of the disclosure. The illustrated components may include those that may be used for antenna element selection, for operating frequency selection, and/or for beamforming for transmission and/or reception of wireless signals. There are numerous architectures for antenna element selection and implementing phase shifting, only one example of which is illustrated here. The architecture 300 includes a modem (modulator/demodulator) 302, a digital-to-analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station 110 described above in connection with FIG. 2 and/or controller/processor 280 of the UE 120 described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear (e.g., one-dimensional) pattern, a planar (e.g., two-dimensional) pattern, or another suitable pattern in one or more dimensions (e.g., a circular design, an elliptical design, or an L-shaped design, among other examples). A spacing between antenna elements 320 ($d$), which may be referred to herein as an inter-antenna element spacing, may be such that signals with a desired wavelength (λ) transmitted separately by the antenna elements 320 may interact or constructively interfere (e.g., to form a desired beam). For example, given an expected range of wavelengths or frequencies, the spacing may provide a quarter wavelength (0.25λ), a half wavelength (0.5λ), or another fraction of a wavelength (n*λ) of spacing between neighboring antenna elements 320 to allow for interaction or constructive interference of signals transmitted by the separate antenna elements 320 within that expected range. In some aspects, the spacing between the antenna elements 320 may be uniform or non-uniform in one or more dimensions (e.g., may be uniform or non-uniform in an azimuth dimension, an elevation dimension, and/or the azimuth and elevation dimensions).

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive decibel (dB)) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more receive (Rx) beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, antenna panels, and/or antenna modules. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single wireless node may include two, four, or more antenna arrays for transmitting or receiving signals at different physical locations on the wireless node or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
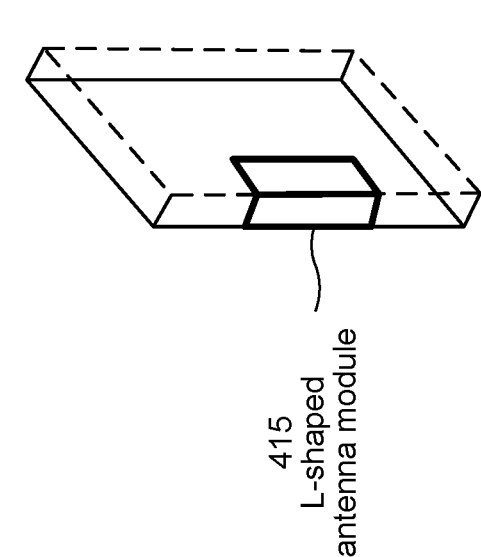
FIG. 4 is a diagram illustrating examples of antenna module designs that may support beamforming for mmW communications, in accordance with the present disclosure.
Figure 4:
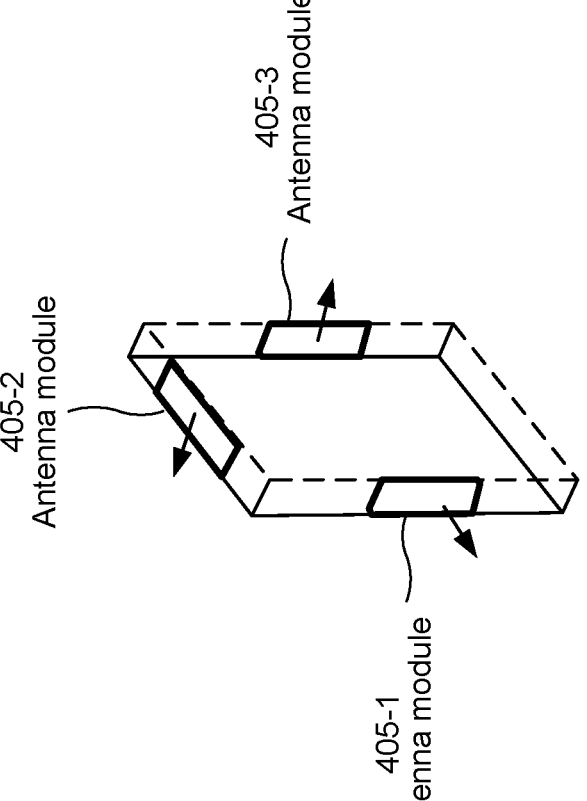

FIG. 4 is a diagram illustrating examples 400, 410 of antenna module designs that may support beamforming for mmW communications, in accordance with the present disclosure.

As described herein, a UE 120 and a network node 110 may use beamforming to improve performance associated with downlink and/or uplink communication over a mmW channel. For example, a mmW channel (e.g., in FR2 and/or FR4) may suffer from high propagation loss because mmW signals have a higher frequency and a shorter wavelength than various other radio waves used for communications (e.g., sub-6 GHz communications in FR1). As a result, mmW signals often have shorter propagation distances, may be subject to atmospheric attenuation, and/or may be more easily blocked and/or subject to penetration loss through objects or other obstructions, among other examples. For example, a mmW signal may be reflected by lamp posts, vehicles, glass/windowpanes, and/or metallic objects, may be diffracted by edges or corners of buildings and/or walls, and/or may be scattered via irregular objects such as walls and/or human bodies (e.g., a hand blocking an antenna module when a device is operated in a gaming mode). Accordingly, beamforming may be used at both the UE 120 and the network node 110 to counter the propagation loss in a mmW channel and thereby improve performance for mmW communication. For example, to achieve a beamforming gain on a downlink, the network node 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction, and the network node 110 may generate a corresponding uplink receive beam.

In this way, beamforming from multiple antennas may provide gains to bridge a link budget over a mmW channel. For example, as described in further detail above with reference to FIG. 3, multiple antenna modules and/or antenna panels may each have a set of antenna elements that can be co-phased to enable beamforming over a mmW channel. Accordingly, using multiple antenna modules and/or antenna panels to enable beamforming may provide capabilities to satisfy spherical coverage requirements with or without blockage (e.g., by a user's hand or body, or by an obstacle in a surrounding environment) regardless of a direction in which a signal is propagating. Furthermore, using multiple antenna modules and/or antenna panels may provide robustness against changes in wireless propagation patterns by enabling beam switching over the multiple antenna modules and/or antenna panels.

For example, referring to FIG. 4, example 400 depicts an antenna module design that is often used to enable beamforming in a UE 120 in a premium or high-tier UE category. For example, as shown in FIG. 4, the antenna module design includes multiple antenna modules 405, each of which includes one or more antenna arrays that may be designed to cover an operating bandwidth associated with a frequency range (e.g., from 24-48 GHz in FR2 and/or 57-71 GHz in FR4, among other examples). For example, in FIG. 4, the UE 120 has three antenna modules (shown as antenna modules 405-1, 405-2, and 405-3) on three edges of the UE 120 (e.g., two long edges and one short or top edge), that each include an antenna array (e.g., a 4×1 or 5×1 dual-polarized antenna array) to support wireless communication in an operating bandwidth. For example, the UE 120 may include different antenna modules 405 and related hardware (e.g., RF integrated circuits (RFICs)) to cover different frequency ranges (e.g., FR1 between 410 MHz and 7.125 GHz, FR2 between 24.25 GHz and 52.6 GHz, FR3 between 7.125 GHz and 24.25 GHz, FR4 between 52.6 GHz and 114.25 GHz, and/or FR5 including frequencies higher than 114.25 GHz, among other examples). Additionally, or alternatively, one or more antenna modules 405 may include an interleaved antenna array in which some antenna elements cover a first bandwidth part and some antenna elements cover a second bandwidth part. For example, in an interleaved antenna array 530 that covers an operating bandwidth within FR2 (e.g., an operating bandwidth from 24-48 GHz), one or more antenna elements may cover a bandwidth part from 28-39 GHz and one or more antenna elements may cover a bandwidth part from 39-48 GHz.

However, as mmW communication systems continue to develop and evolve, there are emerging trends driving greater diversity in antenna module designs. For example, advances in technology permit more antenna elements to be designed within an antenna module controlled by a single radio frequency integrated circuit (RFIC), and original equipment manufacturers (OEMs) are pursuing antenna designs with fewer antenna modules and/or antenna panels to reduce cost, reduce complexity, and improve manufacturing processes (e.g., reducing a number of stock-keeping units (SKUs)) to make mmW communication more accessible to low-end or reduced complexity devices. In general, how the antenna modules are placed within the form factor of a UE 120 is an OEM optimization or design choice, which can lead to different beamforming capabilities and/or performance tradeoffs. For example, referring to FIG. 4, example 410 depicts a UE 120 equipped with an L-shaped antenna module 415, which is an emerging antenna design in which the L-shaped antenna module 415 is mounted on one edge (e.g., a long edge in the example 410 shown in FIG. 4, although it will be appreciated that the L-shaped antenna module 415 may be mounted on a short edge, such as a top edge). For example, the L-shaped antenna module 415 may generally include a first antenna subarray and a second antenna subarray that each comprise N antenna elements on first and second sides of the L-shaped antenna module 415, where the N antenna elements included in each antenna subarray may be arranged in an N×1 uniform linear array (ULA) or another suitable configuration. Note that the above is only an illustrative example with each side of the L-shaped module possibly also accommodating a planar array depending on the frequency of operation. Note also that the two sides of the L-shaped antenna module are typically orthogonal to each other or are designed such that the angle of separation between the two sides exceeds an appropriately configured angle threshold. In this way, a UE 120 may be equipped with a single L-shaped antenna module 415 to reduce costs, and the multiple antenna subarrays included in the L-shaped antenna module 415 may provide better coverage than an antenna module that includes a single antenna array. For example, the 90 degree bend/flexion in the L-shaped antenna module 415 can provide coverage in two different directions in such a way that a single RFIC may be sufficient to control the entire L-shaped antenna module 415. However, one unique challenge that arises with the L-shaped antenna module 415 having two sides is the possibility to either combine antenna elements across the two sides of the L-shaped antenna module 415 or to select the antenna elements across only one side of the L-shaped antenna module 415.

As indicated above, FIG. 4 is provided as an example. Other examples may differ from what is described with regard to FIG. 4.

Figure 5A:
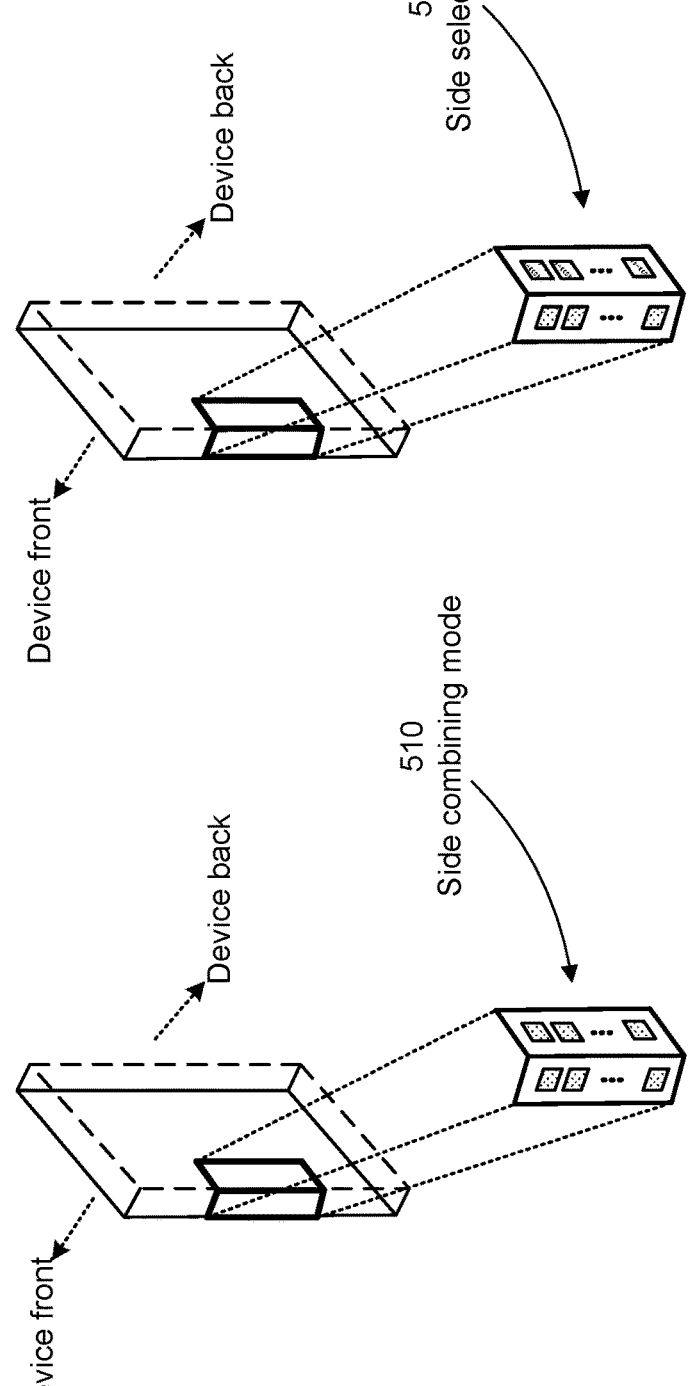
FIGS. 5A-5C are diagrams illustrating an example associated with antenna side combining or antenna side selection in an L-shaped antenna module, in accordance with the present disclosure.
Figure 5B:
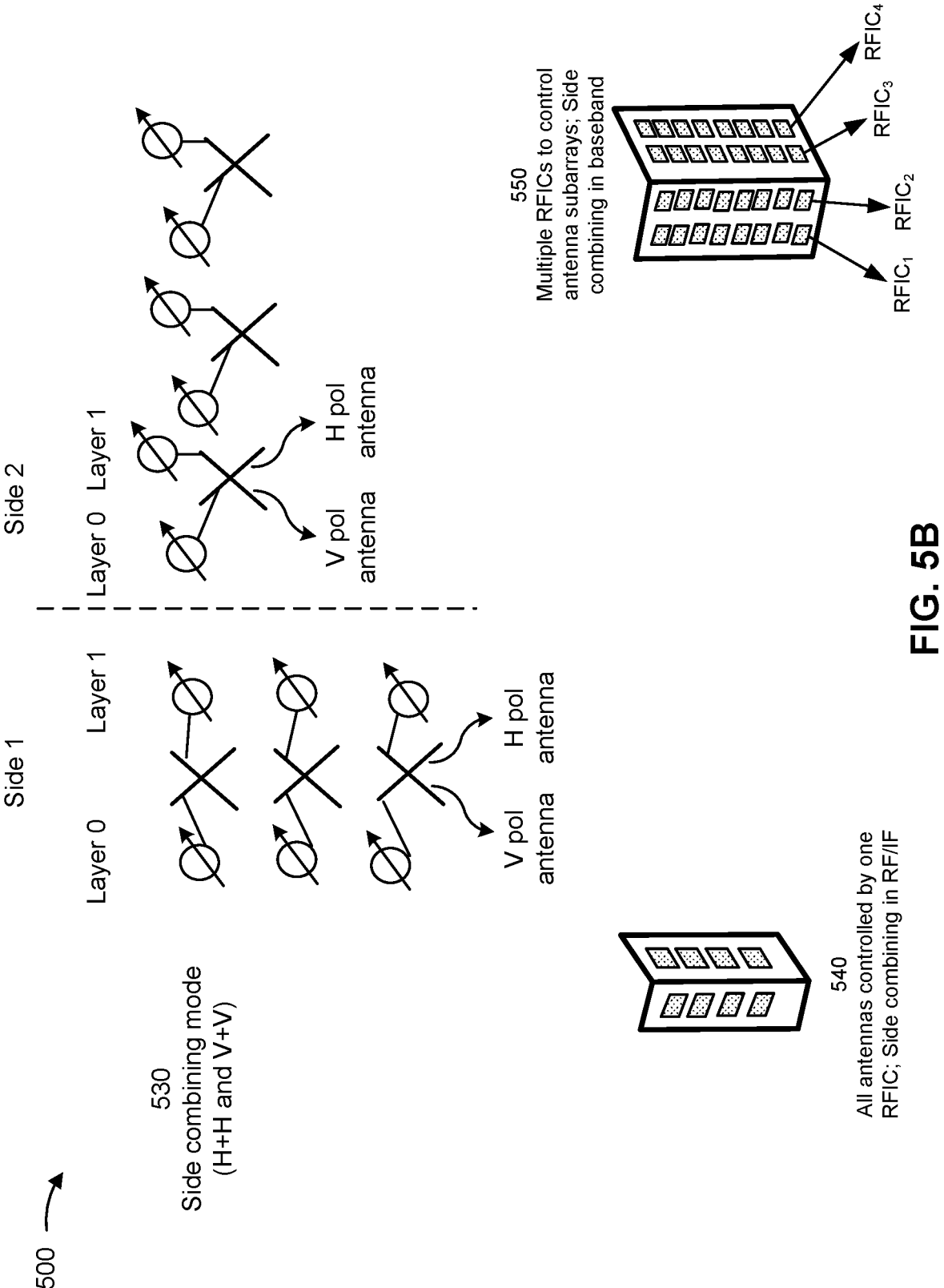
Figure 5C:
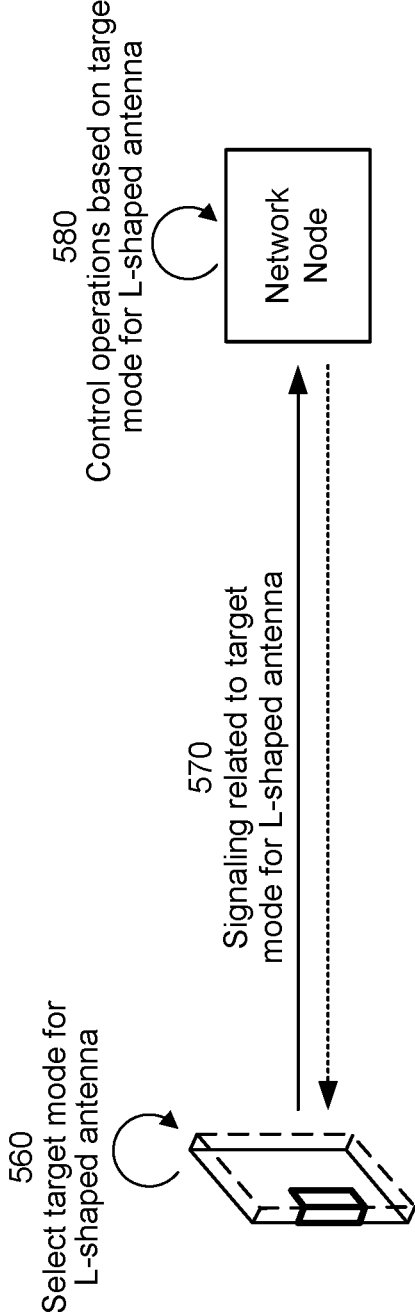

FIGS. 5A-5C are diagrams illustrating an example 500 associated with antenna side combining or antenna side selection in an L-shaped antenna module, in accordance with the present disclosure. As shown in FIGS. 5A-5C, example 500 includes communication between a network node and a UE equipped with an L-shaped antenna module. In some aspects, the network node and the UE may use beamforming to communicate over a mmW channel in a wireless network, such as wireless network 100. The network node and the UE may communicate via a wireless access link, which may include an uplink and a downlink.

In some aspects, as shown in FIG. 5A, the L-shaped antenna module generally includes a first antenna subarray and a second antenna subarray, where each antenna subarray includes multiple antenna elements and the antenna elements on each side of the L are dual-polarized. For example, in some aspects, each antenna subarray may include N antenna elements in an N×1 array (e.g., a 4×1 array). However, it will be appreciated that other possible configurations may be used (e.g., an 8×2 array or the like). As described herein, the two antenna subarrays may be operated in either a side combining mode or a side selection mode, each of which is associated with advantages and tradeoffs. For example, in FIG. 5A, reference number 510 depicts a first configuration in which the L-shaped antenna module is operated in a side combining mode, where all or some of the antenna elements on both sides of the L-shaped antenna module are active simultaneously. Alternatively, as further shown in FIG. 5A, reference number 520 depicts a second configuration in which the L-shaped antenna module is operated in a side selection mode, where the antenna elements on a first side of the L-shaped antenna module are active and the antenna elements on a second side of the L-shaped antenna module are inactive. In general, the side combining mode may offer a better array gain relative to the side selection mode, but may also consume more power and/or carry a larger thermal overhead (e.g., generate more heat) than the side selection mode. Similarly, the side selection mode may offer reduced power consumption and/ or thermal overhead relative to the side combining mode, but may offer a lower array gain that may be unsuitable for applications or use cases with high data rate requirements.

As shown in FIG. 5B, the UE equipped with the L-shaped antenna module may be configured to operate the L-shaped antenna module in the side combining mode by combining antenna elements across the two sides for increased array gains at the cost of increased power consumption and increased thermal overhead (e.g., because a larger number of antenna elements are used relative to the side selection mode). Furthermore, because the antenna elements on each side of the L-shaped antenna module are dual-polarized, different configurations can be used to combine the antenna elements on the two sides of the L-shaped antenna module. For example, referring to FIG. 5B, reference number 530 depicts an H+H and V+V configuration for the side combining mode, where each side of the L-shaped antenna module (shown as Side 1 and Side 2) includes antenna elements with horizontal (H) polarizations and vertical (V) polarizations connected to phase shifters (shown as circles with arrows through the circles). In the H+H and V+V configuration shown by reference number 530, the UE may be configured to connect antenna elements with horizontal polarizations on both sides to a first layer (Layer 0), and to connect the antenna elements with vertical polarizations on both sides to a second layer (Layer 1). Alternatively, in an H+V and V+H configuration (not shown), the UE may connect the antenna elements with horizontal polarizations on the first side and the antenna elements with vertical polarizations on the second side to a first layer (Layer 0), and may connect the antenna elements with vertical polarizations on the first side and the antenna elements with horizontal polarizations on the second side to a second layer (Layer 1). Alternatively, in a side selection mode where the UE selects the best of the two sides of the L-shaped antenna module (e.g., based on a performance, power, and/or thermal constraint), the horizontally polarized antenna elements on the selected side may be connected to the first layer and the vertically polarized antenna elements on the selected side may be connected to the second layer (or vice versa).

In some aspects, when operating the L-shaped antenna module in the side combining mode, the UE may select between the H+H and V+V configuration (e.g., shown by reference number 530) and the H+V and V+H configuration to optimize one or more parameters. For example, whether the H+H and V+V configuration or the H+V and V+H configuration works better for a particular use case may depend on polarization-specific performance, an angle of interest corresponding to the angular spread of the dominant cluster in the channel, a number of antenna elements used in the respective antenna subarrays, and/or a design of the UE (e.g., a housing design or a placement of the L-shaped antenna module within the housing may impact performance, power consumption, and/or thermal overhead). Furthermore, the different configurations may be associated with an RSRP differential, a power differential, and/or a thermal differential across layers, which may necessitate intervention by the network node in the form of power and/or rate control. Accordingly, as described below with reference to FIG. 5C, the UE and the network node may exchange signaling related to the target mode in which the UE is operating the L-shaped antenna module (e.g., the side combining mode or the side selection mode) so that the network node can appropriately schedule multiple layers of (e.g., 2 layer or 4 layer) transmission and/or reception and/or turn on power control operations across polarization layers. Furthermore, in cases where the UE is operating the L-shaped antenna module in the side combining mode, the UE and the network node may exchange signaling related to a polarization configuration used in the side combining mode (e.g., the H+H and V+V configuration or the H+V and V+H configuration) as this could also impact transmissions from the network node.

In some aspects, when operating the L-shaped antenna module in the side combining mode, the UE may perform the side combining (e.g., combining energy from all antenna elements in both sides of the L-shaped antenna module) at an RF (e.g., a frequency at which signals are transmitted and/or received), at an IF (e.g., a frequency to which a carrier wave is shifted as an intermediate step in transmission or reception in a superheterodyne receiver architecture), or at a baseband (e.g., a range of frequencies occupied by a signal that has not been modulated to higher frequencies). For example, in some aspects, whether the side combining is performed at the RF, IF, or baseband may depend on factors such as the number of antenna elements in the antenna subarrays on either or both sides of the L-shaped antenna module, a number of RFICs used to control the antenna elements included in the L-shaped antenna module, or the like. For example, referring to FIG. 5B, reference number 540 depicts an example configuration for the L-shaped antenna module, where each side of the L-shaped antenna module includes a 4×1 antenna subarray to support communication at 28 GHz. In this case, all antenna elements (e.g., including the 4×1 antenna subarray on the first side of the L-shaped antenna module and the 4×1 antenna subarray on the second side of the L-shaped antenna module) may be controlled by a single RFIC, which allows side combining to be performed at an RF or an IF. However, at higher frequencies (e.g., 60 GHz), the same antenna aperture may accommodate a larger number of antenna elements, which may require additional RFICs to control the various antenna subarrays. For example, referring to FIG. 5B, reference number 550 depicts an example configuration for the L-shaped antenna module, where the aperture of a 4×1 antenna subarray at 28 GHz can accommodate an 8×2 antenna subarray to support communication at 60 GHz. Accordingly, because one RFIC can generally/optimally control only 16 antenna feeds over two polarizations (e.g., horizontal and vertical), a total of four RFICs are needed to control the 8×2 antenna subarrays on both sides of the L-shaped antenna module, which means that side combining has to be performed at an IF or baseband (e.g., combining across RFICs can be performed at an IF or a baseband).

In some aspects, as shown in FIG. 5C, and by reference number 560, the UE may be configured to select a target mode in which to operate the L-shaped antenna module, where the selected target mode may be the side combining mode in which antenna elements across both sides of the L-shaped antenna module are combined or the side selection mode in which the only the antenna elements on the best side of the L-shaped antenna module are used. For example, in some aspects, the UE may select the target mode (either the side combining mode or the side selection mode) based on a performance requirement (e.g., a required array gain or data rate associated with one or more use cases), a power constraint, and/or a thermal overhead. For example, in a use case where a high array gain or data rate is required and/or the UE has a high battery charge level or a high thermal budget, the UE may select the side combining mode to increase performance at the cost of higher power consumption and/or thermal overhead. In another example, in a use case where a high array gain or data rate is not required and/or the UE has a low battery charge level or a low thermal budget, the UE may select the side selection mode to reduce power consumption and/or thermal overhead.

As further shown in FIG. 5C, and by reference number 570, the UE and the network node may exchange signaling related to the target mode in which the L-shaped antenna module is to be operated. For example, in some aspects, the UE may select the target mode based on performance, power, thermal, or other parameters, and may transmit signaling to the network node to indicate, to the network node, the target mode selected by the UE. Alternatively, in some aspects, the UE may transmit information related to one or more parameters to the network node, and the network node may select the target mode based on the information transmitted by the UE. For example, in some aspects, the UE may transmit information to the network node to indicate an array gain associated with the side combining mode and/or the side selection mode, a power consumption associated with the side combining mode and/or the side selection mode, a thermal overhead associated with the side combining mode and/or the side selection mode, or the like. In this case, the network node may select the appropriate target mode for the UE based on the parameters indicated by the UE, and may transmit signaling to the UE to indicate the target mode in which the UE is to operate the L-shaped antenna module. Furthermore, in cases where the UE and/or the network node selects the side combining mode as the target mode for the L-shaped antenna module, there may be an RSRP differential, a power differential, a thermal differential, and/or another differential based on the polarizations used across the two layers. Accordingly, in some aspects, the UE may transmit, to the network node, signaling to indicate the RSRP, power, thermal, and/or other differential across the two layers in the side combining mode. In this way, as shown by reference number 580, the network node may perform appropriate control operations (e.g., power and/or rate control operations) based on the RSRP, power, thermal, and/or other differential across the two layers in the side combining mode. For example, in current antenna designs where antenna modules do not include antenna elements with different beam steering angles, multiple layers are mostly symmetric such that there is no need to indicate the differential in RSRP, power, thermal, and/or other parameters. However, when antenna elements with different steering angles are combined in an L-shaped antenna module, the layers may be asymmetric, whereby the network node may need to perform power and/or rate control operations to handle the RSRP, power, and/or thermal differential across layers.

Additionally, or alternatively, in some aspects, the UE and the network node may exchange signaling to coordinate a transmission configuration indicator (TCI) state based on the target mode for the L-shaped antenna module. For example, in some aspects, a TCI state that offers the best performance for the side combining mode may differ from a TCI state that offers the best performance for the side selection mode. Accordingly, in cases where the UE selects the target mode for the L-shaped antenna module, the UE may transmit, to the network node, a request to activate a TCI state that offers the best performance for the target mode selected by the UE, and the network node may transmit a response that includes information to activate the TCI state associated with the target mode. Alternatively, in cases where the network node selects the target mode based on the parameters indicated by the UE, the network node may transmit information to the UE to activate the appropriate TCI state associated with the target mode selected by the network node.

As indicated above, FIGS. 5A-5C are provided as an example. Other examples may differ from what is described with regard to FIGS. 5A-5C.

Figure 6:
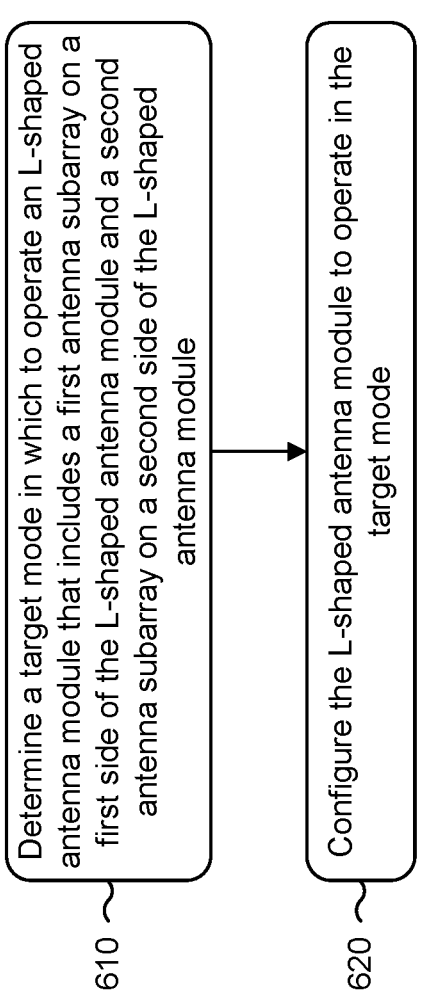
FIG. 6 is a diagram illustrating an example process associated with antenna side combining or antenna side selection in an L-shaped antenna module, in accordance with the present disclosure.

FIG. 6 is a diagram illustrating an example process 600 performed, for example, by a UE, in accordance with the present disclosure. Example process 600 is an example where the UE (e.g., UE 120) performs operations associated with antenna side combining or antenna side selection in an L-shaped antenna module.

As shown in FIG. 6, in some aspects, process 600 may include determining a target mode in which to operate an L-shaped antenna module that includes a first antenna subarray on a first side of the L-shaped antenna module and a second antenna subarray on a second side of the L-shaped antenna module (block 610). For example, the UE (e.g., using communication manager 140 and/or antenna configuration component 708, depicted in FIG. 7) may determine a target mode in which to operate an L-shaped antenna module that includes a first antenna subarray on a first side of the L-shaped antenna module and a second antenna subarray on a second side of the L-shaped antenna module, as described above.

As further shown in FIG. 6, in some aspects, process 600 may include configuring the L-shaped antenna module to operate in the target mode (block 620). For example, the UE (e.g., using communication manager 140 and/or antenna configuration component 708, depicted in FIG. 7) may configure the L-shaped antenna module to operate in the target mode, as described above.

Process 600 may include additional aspects, such as any single aspect or any combination of aspects described below and/or in connection with one or more other processes described elsewhere herein.

In a first aspect, the first antenna subarray includes a first set of dual-polarized antenna elements and the second antenna subarray includes a second set of dual-polarized antenna elements.

In a second aspect, alone or in combination with the first aspect, the target mode is a side combining mode in which active antenna elements included in the first antenna subarray are combined with active antenna elements included in the second antenna subarray.

In a third aspect, alone or in combination with one or more of the first and second aspects, configuring the L-shaped antenna module to operate in the side combining mode includes connecting, to a first layer, active antenna elements included in the first antenna subarray and the second antenna subarray that have a horizontal polarization, and connecting, to a second layer, active antenna elements included in the first antenna subarray and the second antenna subarray that have a vertical polarization.

In a fourth aspect, alone or in combination with one or more of the first through third aspects, configuring the L-shaped antenna module to operate in the side combining mode includes connecting, to a first layer, active antenna elements included in the first antenna subarray that have a horizontal polarization and active antenna elements included in the second antenna subarray that have a vertical polarization, and connecting, to a second layer, active antenna elements included in the first antenna subarray that have a vertical polarization and active antenna elements included in the second antenna subarray that have a horizontal polarization.

In a fifth aspect, alone or in combination with one or more of the first through fourth aspects, process 600 includes transmitting, to a network node, information that indicates one or more of a power differential or an RSRP differential across a first layer and a second layer in the side combining mode.

In a sixth aspect, alone or in combination with one or more of the first through fifth aspects, the active antenna elements included in the first antenna subarray are combined with the active antenna elements included in the second antenna subarray at an RF, an IF, or a baseband.

In a seventh aspect, alone or in combination with one or more of the first through sixth aspects, the target mode is a side selection mode in which antenna elements in either the first antenna subarray or the second antenna subarray are active and antenna elements in the other antenna subarray are inactive.

In an eighth aspect, alone or in combination with one or more of the first through seventh aspects, configuring the L-shaped antenna module to operate in the side selection mode includes connecting, to a first layer, active antenna elements included in either the first antenna subarray or the second antenna subarray that have a horizontal polarization, and connecting, to a second layer, active antenna elements included in either the first antenna subarray or the second antenna subarray that have a vertical polarization.

In a ninth aspect, alone or in combination with one or more of the first through eighth aspects, the target mode is determined based at least in part on a performance requirement, a power constraint, or a thermal constraint.

In a tenth aspect, alone or in combination with one or more of the first through ninth aspects, process 600 includes transmitting, to a network node, one or more parameters associated with a side combining mode and one or more parameters associated with a side selection mode, and receiving, from the network node, information that indicates whether to use the side combining mode or the side selection mode as the target mode based at least in part on the one or more parameters associated with the side combining mode and the one or more parameters associated with the side selection mode.

In an eleventh aspect, alone or in combination with one or more of the first through tenth aspects, process 600 includes transmitting, to a network node, a request to communicate using a TCI state associated with the target mode, and receiving, from the network node, information that activates the TCI state associated with the target mode.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
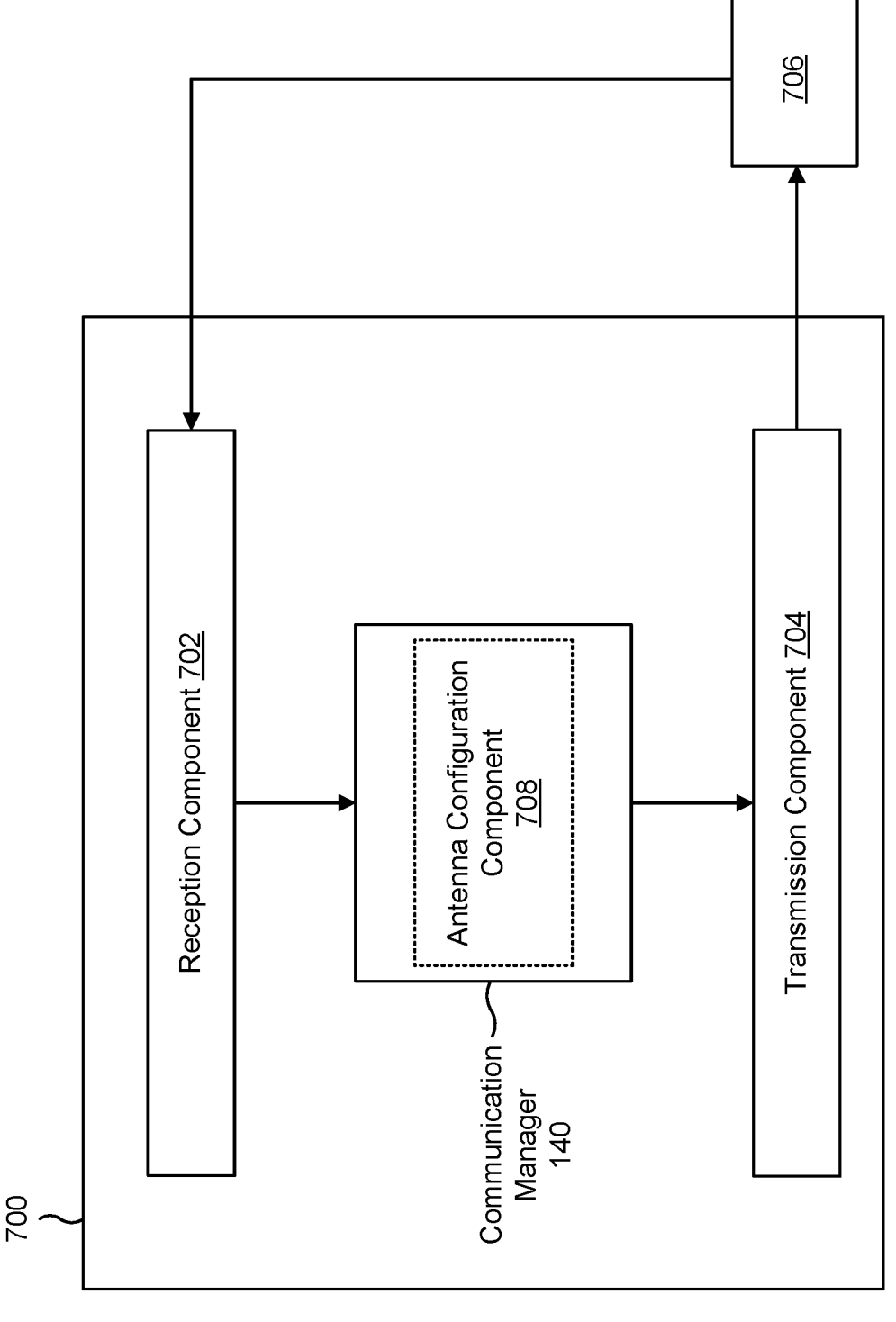
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include an antenna configuration component 708, among other examples.

In some aspects, the apparatus 700 may be configured to perform one or more operations described herein in connection with FIGS. 5A-5C. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The antenna configuration component 708 may determine a target mode in which to operate an L-shaped antenna module that includes a first antenna subarray on a first side of the L-shaped antenna module and a second antenna subarray on a second side of the L-shaped antenna module. The antenna configuration component 708 may configure the L-shaped antenna module to operate in the target mode.

The antenna configuration component 708 may configure the L-shaped antenna module to operate in a side combining mode by connecting, to a first layer, active antenna elements included in the first antenna subarray and the second antenna subarray that have a horizontal polarization, and connecting, to a second layer, active antenna elements included in the first antenna subarray and the second antenna subarray that have a vertical polarization.

The antenna configuration component 708 may configure the L-shaped antenna module to operate in a side combining mode by connecting, to a first layer, active antenna elements included in the first antenna subarray that have a horizontal polarization and active antenna elements included in the second antenna subarray that have a vertical polarization, and connecting, to a second layer, active antenna elements included in the first antenna subarray that have a vertical polarization and active antenna elements included in the second antenna subarray that have a horizontal polarization.

The transmission component 704 may transmit, to a network node, information that indicates one or more of a power differential or an RSRP differential across a first layer and a second layer in the side combining mode.

The antenna configuration component 708 may configure the L-shaped antenna module to operate in a side selection mode by connecting, to a first layer, active antenna elements included in either the first antenna subarray or the second antenna subarray that have a horizontal polarization, and connecting, to a second layer, active antenna elements included in either the first antenna subarray or the second antenna subarray that have a vertical polarization.

The transmission component 704 may transmit, to a network node, one or more parameters associated with a side combining mode and one or more parameters associated with a side selection mode. The reception component 702 may receive, from the network node, information that indicates whether to use the side combining mode or the side selection mode as the target mode based at least in part on the one or more parameters associated with the side combining mode and the one or more parameters associated with the side selection mode.

The transmission component 704 may transmit, to a network node, a request to communicate using a TCI state associated with the target mode. The reception component 702 may receive, from the network node, information that activates the TCI state associated with the target mode.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: determining a target mode in which to operate an L-shaped antenna module that includes a first antenna subarray on a first side of the L-shaped antenna module and a second antenna subarray on a second side of the L-shaped antenna module; and configuring the L-shaped antenna module to operate in the target mode.

Aspect 2: The method of Aspect 1, wherein the first antenna subarray includes a first set of dual-polarized antenna elements and the second antenna subarray includes a second set of dual-polarized antenna elements.

Aspect 3: The method of any of Aspects 1-2, wherein the target mode is a side combining mode in which active antenna elements included in the first antenna subarray are combined with active antenna elements included in the second antenna subarray.

Aspect 4: The method of Aspect 3, wherein configuring the L-shaped antenna module to operate in the side combining mode includes: connecting, to a first layer, active antenna elements included in the first antenna subarray and the second antenna subarray that have a horizontal polarization; and connecting, to a second layer, active antenna elements included in the first antenna subarray and the second antenna subarray that have a vertical polarization.

Aspect 5: The method of Aspect 3, wherein configuring the L-shaped antenna module to operate in the side combining mode includes: connecting, to a first layer, active antenna elements included in the first antenna subarray that have a horizontal polarization and active antenna elements included in the second antenna subarray that have a vertical polarization; and connecting, to a second layer, active antenna elements included in the first antenna subarray that have a vertical polarization and active antenna elements included in the second antenna subarray that have a horizontal polarization.

Aspect 6: The method of any of Aspects 3-5, further comprising: transmitting, to a network node, information that indicates one or more of a power differential or an RSRP differential across a first layer and a second layer in the side combining mode.

Aspect 7: The method of any of Aspects 3-6, wherein the active antenna elements included in the first antenna subarray are combined with the active antenna elements included in the second antenna subarray at an RF, an IF, or a baseband.

Aspect 8: The method of any of Aspects 1-2, wherein the target mode is a side selection mode in which antenna elements in either the first antenna subarray or the second antenna subarray are active and antenna elements in the other antenna subarray are inactive.

Aspect 9: The method of Aspect 8, wherein configuring the L-shaped antenna module to operate in the side selection mode includes: connecting, to a first layer, active antenna elements included in either the first antenna subarray or the second antenna subarray that have a horizontal polarization; and connecting, to a second layer, active antenna elements included in either the first antenna subarray or the second antenna subarray that have a vertical polarization.

Aspect 10: The method of any of Aspects 1-9, wherein the target mode is determined based at least in part on a performance requirement, a power constraint, or a thermal constraint.

Aspect 11: The method of any of Aspects 1-10, further comprising: transmitting, to a network node, one or more parameters associated with a side combining mode and one or more parameters associated with a side selection mode; and receiving, from the network node, information that indicates whether to use the side combining mode or the side selection mode as the target mode based at least in part on the one or more parameters associated with the side combining mode and the one or more parameters associated with the side selection mode.

Aspect 12: The method of any of Aspects 1-11, further comprising: transmitting, to a network node, a request to communicate using a TCI state associated with the target mode; and receiving, from the network node, information that activates the TCI state associated with the target mode.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

selecting, based at least in part on a performance requirement, a power constraint, or a thermal constraint, a target mode from a plurality of modes in which to operate an L-shaped antenna module that includes a first antenna subarray on a first side of the L-shaped antenna module and a second antenna subarray on a second side of the L-shaped antenna module, wherein:

an angle of separation between the first side and the second side exceeds an angle threshold, the plurality of modes include a side selection mode and a side combining mode, the side combining mode is a mode in which active antenna elements included in the first antenna subarray are combined with active antenna elements included in the second antenna subarray, and the side selection mode is a mode in which antenna elements in the first antenna subarray are active and antenna elements in the second antenna subarray are inactive; and configuring the L-shaped antenna module to operate in the target mode, wherein configuring the L-shaped antenna module to operate in the target mode includes:

connecting, to a first layer, a first set of active antenna elements included in the first antenna subarray that have a first polarization; and connecting, to a second layer, a second set of active antenna elements included in the first antenna subarray that have a second polarization.

2. The method of claim 1,
wherein the first antenna subarray includes a first set of dual-polarized antenna elements and the second antenna subarray includes a second set of dual-polarized antenna elements.

3. The method of claim 1,
wherein the target mode is the side combining mode.

4. The method of claim 3, wherein:
the first polarization is a horizontal polarization,
the second polarization is a vertical polarization, and
configuring the L-shaped antenna module to operate in the side combining mode includes:
   connecting, to the first layer, a third set of active antenna elements included in the second antenna subarray that have the horizontal polarization; and
   connecting, to the second layer, a fourth set of active antenna elements included in the second antenna subarray that have the vertical polarization.

5. The method of claim 3, wherein:
the first polarization is a horizontal polarization,
the second polarization is a vertical polarization, and
configuring the L-shaped antenna module to operate in the side combining mode includes:
   connecting, to the first layer, a third set of active antenna elements included in the second antenna subarray that have the vertical polarization; and
   connecting, to the second layer, a fourth set of active antenna elements included in the second antenna subarray that have the horizontal polarization.

6. The method of claim 3, further comprising:
transmitting, to a network node, information that indicates one or more of a power differential or a reference signal received power (RSRP) differential across the first layer and the second layer in the side combining mode.

7. The method of claim 3,
wherein the active antenna elements included in the first antenna subarray are combined with the active antenna elements included in the second antenna subarray at a radio frequency (RF), an intermediate frequency (IF), or a baseband.

8. The method of claim 1,
wherein the target mode is the side selection mode.

9. The method of claim 1, further comprising:
transmitting, to a network node, one or more parameters associated with the side combining mode and one or more parameters associated with the side selection mode; and
receiving, from the network node, information that indicates whether to use the side combining mode or the side selection mode as the target mode based at least in part on the one or more parameters associated with the side combining mode and the one or more parameters associated with the side selection mode.

10. The method of claim 1, further comprising:
transmitting, to a network node, a request to communicate using a transmission configuration indicator (TCI) state associated with the target mode; and
receiving, from the network node, information that activates the TCI state associated with the target mode.

11. The method of claim 1, wherein:
the first polarization is a horizontal polarization, and
the second polarization is a vertical polarization.

12. A user equipment (UE) for wireless communication, comprising:
one or more memories; and
one or more processors, coupled to the one or more memories, configured to:

select, based at least in part on a performance requirement, a power constraint, or a thermal constraint, a target mode from a plurality of modes in which to operate an L-shaped antenna module that includes a first antenna subarray on a first side of the L-shaped antenna module and a second antenna subarray on a second side of the L-shaped antenna module, wherein:
   an angle of separation between the first side and the second side exceeds an angle threshold,
   the plurality of modes include a side selection mode and a side combining mode,
   the side combining mode is a mode in which active antenna elements included in the first antenna subarray are combined with active antenna elements included in the second antenna subarray, and
   the side selection mode is a mode in which antenna elements in the first antenna subarray are active and antenna elements in the second antenna subarray are inactive; and
configure the L-shaped antenna module to operate in the target mode, wherein, to configure the L-shaped antenna module to operate in the target mode, the one or more processors are configured to:
   connect, to a first layer, a first set of active antenna elements included in the first antenna subarray that have a first polarization; and
   connect, to a second layer, a second set of active antenna elements included in the first antenna subarray that have a second polarization.

13. The UE of claim 12,
wherein the first antenna subarray includes a first set of dual-polarized antenna elements and the second antenna subarray includes a second set of dual-polarized antenna elements.

14. The UE of claim 12,
wherein the target mode is the side combining mode.

15. The UE of claim 14, wherein:
the first polarization is a horizontal polarization,
the second polarization is a vertical polarization, and
the one or more processors, to configure the L-shaped antenna module to operate in the side combining mode, are configured to:
   connect, to the first layer, a third set of active antenna elements included in the second antenna subarray that have the horizontal polarization; and
   connect, to the second layer, a fourth set of active antenna elements included in the second antenna subarray that have the vertical polarization.

16. The UE of claim 14, wherein:
the first polarization is a horizontal polarization,
the second polarization is a vertical polarization, and
the one or more processors, to configure the L-shaped antenna module to operate in the side combining mode, are configured to:
   connect, to the first layer, a third set of active antenna elements included in the second antenna subarray that have the vertical polarization; and
   connect, to the second layer, a fourth set of active antenna elements included in the second antenna subarray that have the horizontal polarization.

17. The UE of claim 14,
wherein the one or more processors are further configured to:
   transmit, to a network node, information that indicates one or more of a power differential or a reference signal received power (RSRP) differential across the first layer and the second layer in the side combining mode.

18. The UE of claim 14, wherein the active antenna elements included in the first antenna subarray are combined with the active antenna elements included in the second antenna subarray at a radio frequency (RF), an intermediate frequency (IF), or a baseband.

19. The UE of claim 12, wherein the target mode is the side selection mode.

20. The UE of claim 12, wherein the one or more processors are further configured to:

transmit, to a network node, one or more parameters associated with the side combining mode and one or more parameters associated with the side selection mode; and receive, from the network node, information that indicates whether to use the side combining mode or the side selection mode as the target mode based at least in part on the one or more parameters associated with the side combining mode and the one or more parameters associated with the side selection mode.

21. The UE of claim 12, wherein the one or more processors are further configured to:

transmit, to a network node, a request to communicate using a transmission configuration indicator (TCI) state associated with the target mode; and receive, from the network node, information that activates the TCI state associated with the target mode.

22. The UE of claim 12, wherein:

the first polarization is a horizontal polarization, and the second polarization is a vertical polarization.

23. A non-transitory computer-readable medium storing a set of instructions for wireless communication, the set of instructions comprising:

one or more instructions that, when executed by one or more processors of a user equipment (UE), cause the UE to:

select, based at least in part on a performance requirement, a power constraint, or a thermal constraint, a target mode from a plurality of modes in which to operate an L-shaped antenna module that includes a first antenna subarray on a first side of the L-shaped antenna module and a second antenna subarray on a second side of the L-shaped antenna module, wherein;

an angle of separation between the first side and the second side exceeds an angle threshold, the plurality of modes include a side selection mode and a side combining mode, the side combining mode is a mode in which active antenna elements included in the first antenna subarray are combined with active antenna elements included in the second antenna subarray, and the side selection mode is a mode in which antenna elements in the first antenna subarray are active and antenna elements in the second antenna subarray are inactive; and configure the L-shaped antenna module to operate in the target mode, wherein, to configure the L-shaped antenna module to operate in the target mode, the one or more instructions cause the UE to:

connect, to a first layer, a first set of active antenna elements included in the first antenna subarray that have a first polarization; and connect, to a second layer, a second set of active antenna elements included in the first antenna subarray that have a second polarization.

24. The non-transitory computer-readable medium of claim 23, wherein the target mode is the side combining mode.

25. The non-transitory computer-readable medium of claim 23, wherein the target mode is the side selection mode.

26. The non-transitory computer-readable medium of claim 23, wherein:

the first polarization is a horizontal polarization, and the second polarization is a vertical polarization.

27. An apparatus for wireless communication, comprising:

means for selecting, based at least in part on a performance requirement, a power constraint, or a thermal constraint, a target mode from a plurality of modes in which to operate an L-shaped antenna module that includes a first antenna subarray on a first side of the L-shaped antenna module and a second antenna subarray on a second side of the L-shaped antenna module, wherein:

an angle of separation between the first side and the second side exceeds an angle threshold, the plurality of modes include a side selection mode and a side combining mode, the side combining mode is a mode in which active antenna elements included in the first antenna subarray are combined with active antenna elements included in the second antenna subarray, and the side selection mode is a mode in which antenna elements in the first antenna subarray are active and antenna elements in the second antenna subarray are inactive; and means for configuring the L-shaped antenna module to operate in the target mode, wherein the means for configuring the L-shaped antenna module to operate in the target mode include:

means for connecting, to a first layer, a first set of active antenna elements included in the first antenna subarray that have a first polarization; and means for connecting, to a second layer, a second set of active antenna elements included in the first antenna subarray that have a second polarization.

28. The apparatus of claim 27, wherein the target mode is the side combining mode.

29. The apparatus of claim 27, wherein the target mode is the side selection mode.

30. The apparatus of claim 27, wherein:

the first polarization is a horizontal polarization, and the second polarization is a vertical polarization.

* * * * *